US006189741B1

(12) United States Patent
Behar

(10) Patent No.: US 6,189,741 B1
(45) Date of Patent: Feb. 20, 2001

(54) DEVICE FOR DISTRIBUTION OF FLUID PRODUCTS

(75) Inventor: Alain Behar, Suresnes (FR)

(73) Assignee: Valois S.A., le Neubourg (FR)

( * ) Notice: Under 35 U.S.C. 154(b), the term of this patent shall be extended for 0 days.

(21) Appl. No.: 09/414,758

(22) Filed: Oct. 7, 1999

(51) Int. Cl.[7] .................... G01F 11/00
(52) U.S. Cl. .................... 222/321.7
(58) Field of Search .................... 222/383.1, 382, 222/321.7, 569

(56) References Cited

U.S. PATENT DOCUMENTS

| | | |
|---|---|---|
| 3,073,470 | 1/1963 | Greene . |
| 5,992,704 * | 11/1999 | Jager-Waldau .................... 222/321.7 |

FOREIGN PATENT DOCUMENTS

| | | |
|---|---|---|
| 86 20 974 U | 10/1986 | (DE) . |
| 0 218 528 A2 | 4/1987 | (EP) . |
| 2738553 | 3/1997 | (FR) . |
| 2756546 | 6/1998 | (FR) . |
| 2195974 | 4/1988 | (GB) . |

OTHER PUBLICATIONS

“Rapport De Recherche Preliminaire” dated Nov. 13, 1998 from FR 9804191.

* cited by examiner

*Primary Examiner*—Philippe Derakshani
(74) *Attorney, Agent, or Firm*—Rockey, Milnamow & Katz, Ltd.

(57) ABSTRACT

The present invention relates to a device for distribution of fluid products of the type which has container (1) in which product (P) to be distributed is held and on which a distribution device is mounted, which is engaged in opening (2) of container (1) by the intermediary of bushing (3) and a sleeve. The invention consists of the fact that bushing (3) has cylindrical skirt (31) and at least two deformable tabs (33) arranged in the extension of cylindrical skirt (31) defining a receiving space for the sleeve in which pump body (4) is mounted, at least free ends (33*a*) of tabs (33), before introduction of pump body (4), projecting towards the interior of said space in order to allow passage through opening (2), bushing (3) having radial projection (32) in such a way that, when radial projection (32) rests on the exterior edge of opening (2), tabs (33) project inside of container (1) at most up to zone of connection (a) with cylindrical skirt (31) and are separated by the sleeve in such a way as to lock bushing (3) in the opening.

10 Claims, 2 Drawing Sheets

DEVICE FOR DISTRIBUTION OF FLUID PRODUCTS

Figures 1A, 1B, 1C:
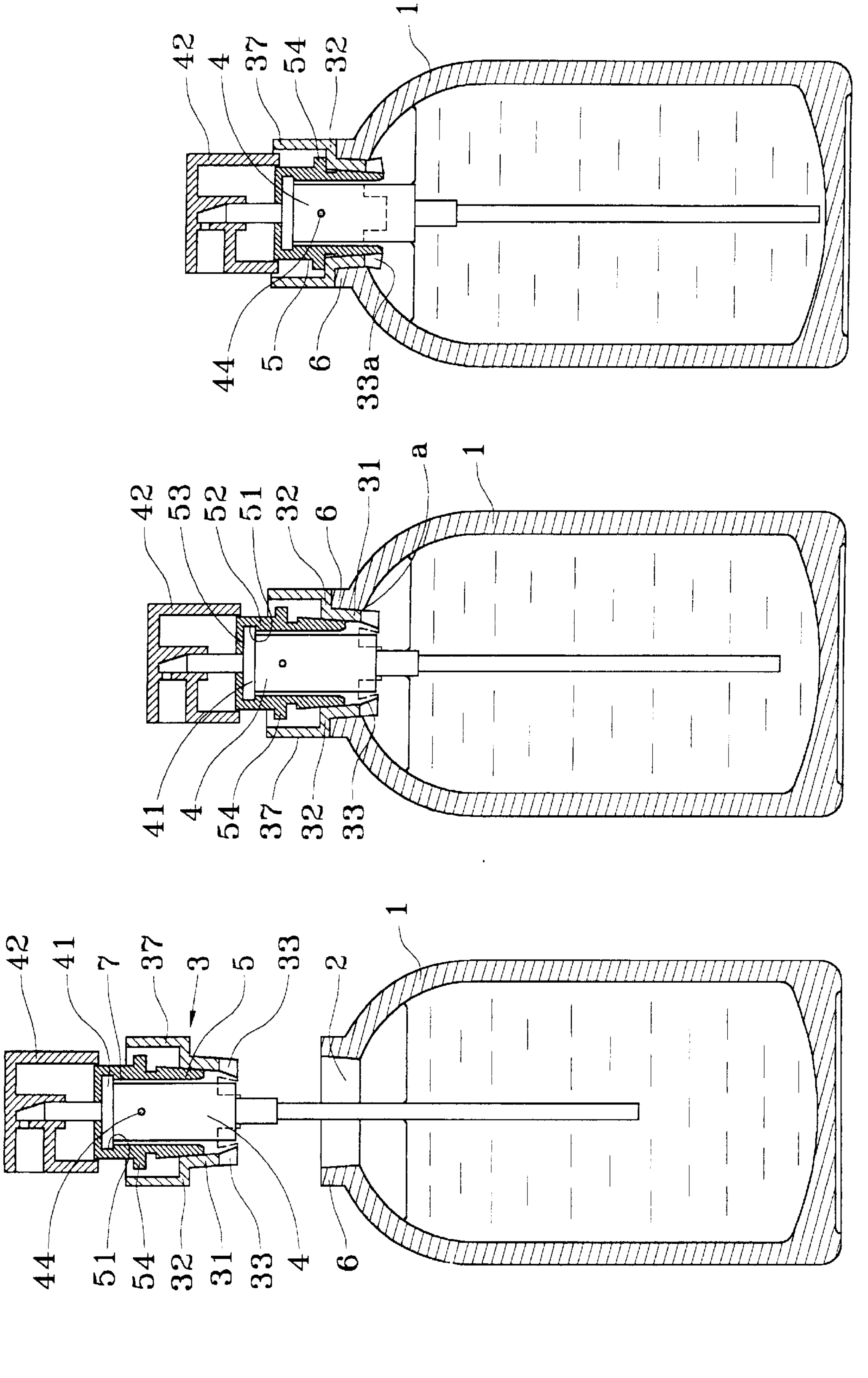

The present invention relates to a device for distribution of fluid products of the type which has a container in which the product to be distributed is held and on which distribution means, such as a pump, are mounted.

Generally, containers holding a product which is to be distributed are provided with a neck in which the distribution means, such as a pump, are engaged. The attachment of the pump on the neck can be obtained in various ways.

Thus, a known method is to engage a pump body by force in the neck of the container. This execution is advantageous from an economic standpoint, inasmuch as the number of pieces used is limited, but it is not always simple to execute. In particular, during mounting, the phenomena of excessive pressure can come about.

Another method consists of doing traditional setting. Recent years have seen the development of the use of bushings containing the pump and ensuring the positioning as well as the attachment on the neck by cooperation of the bushing, of the external walls of the neck and of a ring, such as in U.S. Pat. No. 4,984,702, GB-A-2 274 836 or else U.S. Pat. No. 4,773,553. These bushings in general allow tolerance of the small size differences which can occur on the container during manufacturing.

The document FR-2 756 546 describes a device for attachment of a pump in the neck of a container. This device uses a deformable bushing which forms a skirt with tabs which project towards the interior before mounting. The bushing also forms a stop flange. The skirt with its tabs is introduced in the neck of the container until the flange rests on the neck of the container. Then, the body of the pump is force fit in the skirt by deforming it or compressing it. After fitting, the pump body forces the tabs towards the exterior under the neck of the container, thus locking the bushing in the neck.

The disadvantage with this attachment device is that the pump cannot be pre-mounted in the bushing, because the pump deforms the bushing by expanding its skirt.

The aim of the present invention is to palliate this disadvantage by defining a distribution device which is provided with attachment means on which the pump can be pre-mounted, in such a way as to form a unit which simply has to be mounted on the appropriate container.

For this purpose, the invention provides a distributor with the characteristics disclosed in the main claim.

Thus, it is possible to pre-assemble the pump body in the bushing, the pump body being engaged in the internal sleeve and this sleeve being partially engaged in the receiving space in such a way as to extend only in the receiving space defined by the cylindrical skirt so that the tabs of the bushing always projecting towards the interior of the receiving space allow passage through an opening. Thus, this assembly is then positioned on the opening of a container in such a way that the tabs project below the opening in the container. Then, the sleeve, provided with the pump, is pressed in so that its radial projection rests against the end of the cylindrical skirt, merged with the radial projection of the bushing; the sleeve resting then on the ends of the projecting tabs in the receiving space and said tabs separating towards the exterior of the bushing under the opening of the container form means of holding said bushing in said opening.

According to one execution variant of a bushing according to the invention, the container can be provided with a neck; in this case, the cylindrical skirt of the bushing is arranged so as to extend along the internal wall of the neck, and the tabs of the bushing project inside the container at most up to the zone of connection with the cylindrical skirt, the exterior radial projection of the bushing resting on the upper edge of the neck of the container.

According to a second execution variant of a bushing according to the invention, the container does not have a neck, and the opening of the container is arranged in a wall of said container, the cylindrical skirt being arranged so that the tabs extend projecting inside the container at most up to the zone of connection with said cylindrical skirt, the exterior radial projection of the bushing resting on the periphery of the opening of the container.

When a venting pump is used in a device according to the invention, the dimensions of the receiving space defined by the cylindrical skirt or the dimensions of the internal sleeve are such that once the pump body is housed in the sleeve, a space is arranged between the interior surface of the internal sleeve and the exterior surface of the pump body, the vent of the pump thus being in communication with the interior of the container by the intermediary of said space and the spaces separating the tabs of the bushing.

In the case of another type of pump such as a so-called “airless” pump, it is possible not to provide this space.

According to an execution variant of the invention, the tabs arranged in the extension of the cylindrical skirt of the bushing are connected together by cylindrical skirt portions, said cylindrical skirt portions having a thickness less than the thickness of the tabs.

Preferably, these cylindrical skirt portions are connected to the cylindrical skirt of the bushing and have a thickness less than the thickness of this bushing.

Thus, during introduction of the bushing in the opening of a container, the tabs are held together, and any risk of untimely separation or overturning of a tab during this introduction is avoided.

Preferably, these cylindrical skirt portions are elastically deformable, and when the tabs are separated towards the exterior of the bushing, the cylindrical skirt portions elastically deform because of their sufficiently small thickness and do not work against the separation of the tabs but rather deform in order to accompany this movement of the tabs towards the exterior of said bushing. In this case, the aesthetic appearance of the distribution device is kept when the container is transparent or translucent, the bushing being continuous.

It is also possible to provide that at each connection between a tab and a cylindrical skirt portion, a breaking starting point is arranged so that during separation of the tabs, each connection between a cylindrical skirt portion and a tab breaks so as not to stand in the way of separation of the tabs.

Preferably, the bushing is a piece molded out of a flexible material such as high density polyethylene or low density polyethylene.

Figure 2A:
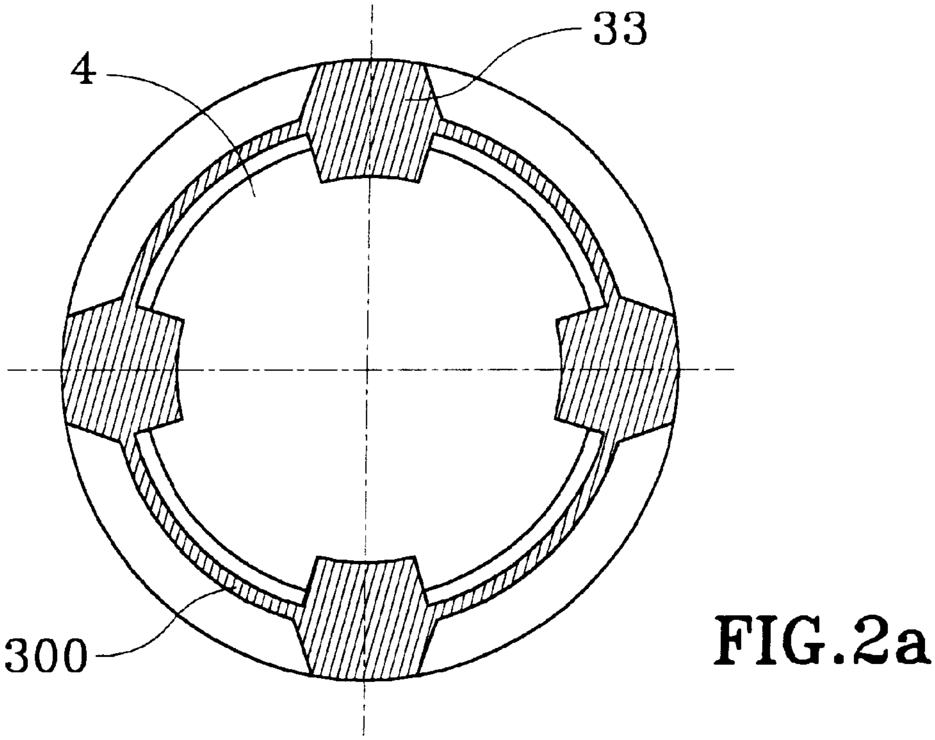
Figure 2B:
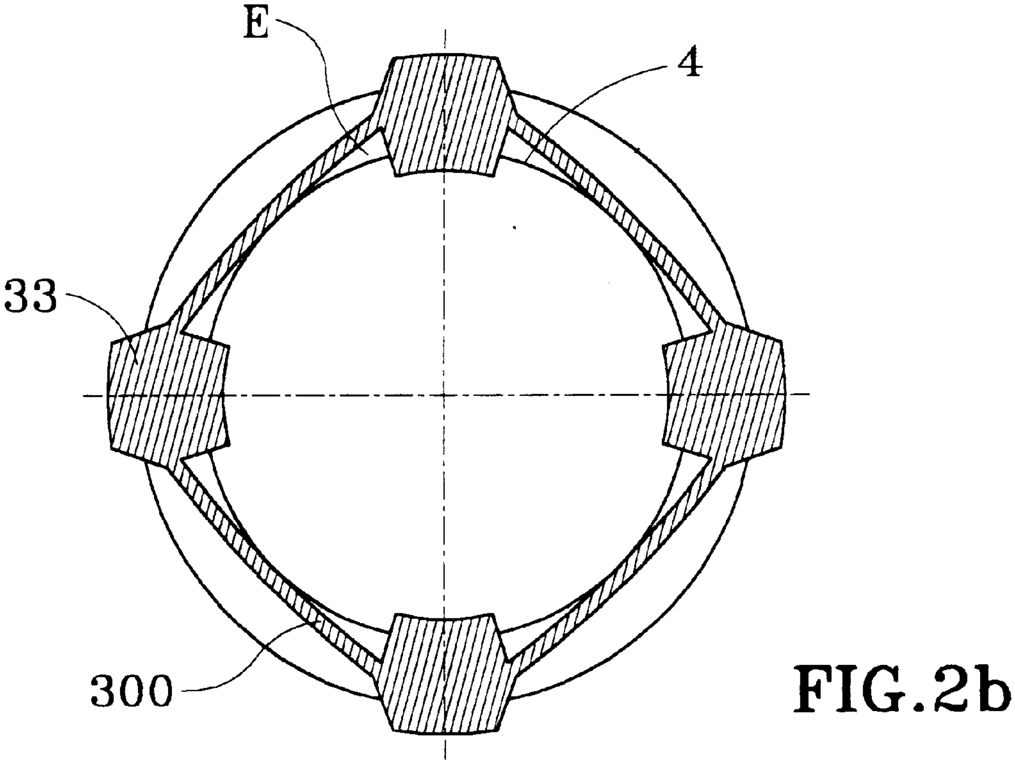

The invention will now be described in more detail in reference to the drawings in which:

FIGS. 1*a*, 1*b* and 1*c* represent views in section of a distributing device according to a form of execution of the invention at different stages of the assembly; and FIGS. 2*a* and 2*b* respectively represent a view in cross section of a bushing according to a form of execution.

In FIGS. 1*a*, 1*b* and 1*c*, bushing 3 according to the invention has been represented. Bushing 3 has cylindrical skirt 31 which extends downward by tabs 33. The bushing cooperates with sleeve 5 for receiving of pump body 4, allowing preassembling of pump body 4 and bushing 3 before mounting on container 1 which has opening 2 with a circular cross section.

This sleeve 5 is arranged in such a way as to receive pump body 4, that is to say that it has on its interface surface some means of catching in the form of groove 51 in which flange 41, formed by pump body 4, is housed, said groove 51 forming shoulder 52 which is housed in flange 41 and shoulder 53 which rests on flange 41. Preferably, shoulder 53 is arranged in such a way to cover pump body 4 almost completely.

Pump body 4 is therefore mounted definitively in sleeve 5 which is itself engaged partially in a receiving space for pump body 4 defined by cylindrical skirt 31 in such a way as to preassemble the unit before mounting on container 1.

In the case of a venting pump, space 7 is arranged between the interior surface of sleeve 5 and the exterior surface of pump body 4, vent 44 of pump body 4 being in communication with the interior of container 1' by the intermediary of said space 7 and the spaces arranged between tabs 33 of bushing 3.

Cylindrical skirt 31, with a circular cross section complementary to opening 2, presents at its end opposite from tabs 33, radial projection 32. Sleeve 5 is arranged so as to be engaged in the receiving space defined by cylindrical skirt 31 and tabs 33, and the external surface of sleeve 5 is preferably engaged in a sealed manner along the internal surface of cylindrical skirt 31, the external surface of sleeve 5 being conformed preferably conical so as to facilitate engagement in cylindrical skirt 31.

During pre-assembling of bushing 3 and pump body 4, internal sleeve 5 cooperates uniquely only with cylindrical skirt 31 as can be seen in FIG. 1*a*. This pre-assembled unit can then be engaged in opening 2 of container 1 as can be seen in FIG. 1*b*.

On the periphery of radial projection 32, an exterior cylindrical skirt 37 is arranged coaxial with of cylindrical skirt 31.

As can be seen in the figures, container 1' has opening 2 which is provided with neck 6. Bushing 3 and pump body 4 preassembled by means of the sleeve 5 are engaged across opening 2 so that cylindrical skirt 31 extends along neck 6 and the radial projection 32 rests on the upper edge of said neck 6, with tabs 33 projecting in the interior of container 1, the zone of connection a between tabs 33 and cylindrical skirt 31 situated roughly below opening 2 as can be seen in FIG. 1*b*.

Once bushing 3 is engaged on container 1, the assembly is continued by pressing sleeve 5 provided with pump body 4 in the receiving space, the conical shape of sleeve 5 causing the crushing of cylindrical skirt 31 against the edges of opening 2 of container 1 which promotes sealing of the assembly. Sleeve 5 engaged in the receiving space separates ends 33*a* of tabs 33 which are interposed in said receiving space. Internal sleeve 5 furthermore has radial projection 54 on its external surface which rests on the upper edge of cylindrical skirt 31, limiting the engagement of sleeve S through bushing 3.

This separation of tabs 33 under the effect of sleeve 5 forms a stop shoulder below opening 2 of container 1 which constitutes a means of attachment of bushing 3 and the pump on container 1.

In FIGS. 2*a* and 2*b*, a variant of bushing 3 is represented. This bushing 3 is identical to bushing 3 of FIGS. 1*a* to 1*c* with the exception that tabs 33, in this case four in number, arranged in the extension of cylindrical skirt 31, are connected together by cylindrical skirt portions 300, said portions being elastically deformable and having a thickness less than the thickness of cylindrical skirt 31 and of tabs 33.

Tabs 33 in the extension of cylindrical skirt 31 are arranged so as to present at least their lower ends projecting radially inside the receiving space for pump body 4 so that said ends are pushed back by sleeve 5 engaged completely in bushing 3, which deforms tabs 33 pushing them back towards the exterior of bushing 3 below opening 2 of the container 1, tabs 33 no longer being in the extension of the cylindrical skirt.

During the separation of tabs 33 by pump body 4, cylindrical skirt portions 300 deform and in particular are then roughly tangent to pump body 4 of which only the contour is represented in FIGS. 2*a* and 2*b*.

Furthermore, during the separation of tabs 33, deformed cylindrical skirt portions 300 are only partially in contact with pump body 4 so that spaces E are always arranged at the site of tabs 33 in such a way as to allow communication between vent 44 of a pump and the interior of container 1.

As a variant, it is possible to arrange a breaking starting point at the site of skirt portions 300 so that during separation of the tabs, each starting point gives way.

What is claimed is:

1. A device for distribution of fluid products of the type which has container (1) in which product (P) to be distributed is held and on which distribution means are mounted, such as a pump having pump body (4) and push button (42), said pump body being engaged in opening (2) of container (1) by the intermediary of bushing (3) whose cross section is complementary to the cross section of opening (2) of container (1) and which has cylindrical skirt (31) and at least two deformable tabs (33) arranged in the extension of cylindrical skirt (31), at least free ends (33*a*) of tabs (33), before introduction of the pump body, being directed in such a way as to allow passage through opening (2) of container (1), said bushing (3) also having radial projection (32) arranged on the exterior surface in such a way that, when said radial projection (32) rests on the exterior edge of opening (2) of container (1), tabs (33) of bushing (3) project extending inside container (1) at most up to the zone of connection (a) with cylindrical skirt (31), characterized by the fact that bushing (3) moreover has internal sleeve (5) provided with some means of catching in which pump body (4) is caught, said internal sleeve (5) being arranged so as to be housed in a receiving space defined by cylindrical skirt (31) and tabs (33) in such a way as to separate the tabs towards the exterior and thus lock the bushing in the opening of the container.

2. A distribution device according to claim 1, in which radial projection (32) on the exterior surface of bushing (3) extends from the end of cylindrical skirt (31) opposite from tabs (33).

3. A distribution device according to claim 1, in which the means of catching includes groove (51) which cooperates with flange (41) formed by pump body (4).

4. A distribution device according to claim 1, in which the sleeve has radial projection (54) suitable for resting on projection (32) of the bushing.

5. A distribution device according to claim 1, in which bushing (3) has, on the exterior peripheral edge of radial projection (32), external skirt (37) coaxial with cylindrical skirt (31) and extending above said radial projection (32) when it rests on the periphery of the exterior edge of opening (2) of container (1).

6. A distribution device according to claim 1, in which, when the pump is venting pump (44), the dimensions of the receiving space defined by the dimensions of internal sleeve (5) are such that once pump body (4) is housed in sleeve (5), space (7) is arranged between the interior surface of internal sleeve (5) and the exterior surface of pump body (4), vent (44) of the pump thus being in communication with the interior of container (1) by the intermediary of said space (7) and the spaces separating tabs (33) of bushing (3).

7. A distribution device according to claim 1, in which tabs (33) of bushing (3) are connected together by cylindrical skirt portions (300), said cylindrical skirt portions (300) having a thickness less than the thickness of tabs (33).

8. A distribution device according to claim 7, in which cylindrical skirt portions (300) are connected to cylindrical skirt (31) of bushing (3) and have a thickness less than the thickness of said cylindrical skirt.

9. A distribution device according to claim 7, in which cylindrical skirt portions (300) are elastically deformable.

10. A distribution device according to claim 7, in which at each connection between tab (33) and cylindrical skirt portion (300), a breaking starting point is arranged so that during separation of tabs (33), each breaking starting point breaks.

* * * * *